(12) United States Patent
Gulotty, Jr. et al.

(10) Patent No.: US 11,840,670 B2
(45) Date of Patent: Dec. 12, 2023

(54) HYDROGENATION OF OLEOCHEMICAL DERIVATIVES AND SYSTEMS

(71) Applicant: Applied Technology Limited Partnership, Doraville, GA (US)

(72) Inventors: Robert J. Gulotty, Jr., Greer, SC (US); Kelsey Abner, Greer, SC (US); Myranda Jackson, Laurens, SC (US)

(73) Assignee: Applied Technology Limited Partnership, Doraville, GA (US)

( * ) Notice: Subject to any disclaimer, the term of this patent is extended or adjusted under 35 U.S.C. 154(b) by 0 days.

(21) Appl. No.: 17/542,084

(22) Filed: Dec. 3, 2021

(65) Prior Publication Data

US 2022/0195312 A1  Jun. 23, 2022

Related U.S. Application Data

(60) Provisional application No. 63/129,502, filed on Dec. 22, 2020.

(51) Int. Cl.
| | | |
|---|---|---|
| *C10G 3/00* | (2006.01) | |
| *C11C 3/12* | (2006.01) | |
| *B01J 21/08* | (2006.01) | |
| *B01J 35/04* | (2006.01) | |
| *B01J 23/44* | (2006.01) | |

(52) U.S. Cl.
CPC ............... *C10G 3/50* (2013.01); *B01J 21/08* (2013.01); *B01J 23/44* (2013.01); *B01J 35/04* (2013.01); *C10G 3/44* (2013.01); *C10G 3/60* (2013.01); *C11C 3/12* (2013.01); *C10G 3/55* (2013.01); *C10G 2300/4006* (2013.01); *C10G 2300/4012* (2013.01); *C10G 2300/4018* (2013.01); *C10G 2300/703* (2013.01)

(58) Field of Classification Search
CPC .... C11C 3/12; B01J 21/18; B01J 35/04; B01J 23/44; C10G 3/50
See application file for complete search history.

(56) References Cited

U.S. PATENT DOCUMENTS

| | | |
|---|---|---|
| 4,133,822 A | 1/1979 | Hasman |
| 4,385,001 A | 5/1983 | Rosen |
| 4,510,092 A | 4/1985 | Rosen |

(Continued)

FOREIGN PATENT DOCUMENTS

| | | | | |
|---|---|---|---|---|
| CA | 1157844 A | * | 11/1983 | ............... B01J 23/44 |
| EP | 2380953 | | 10/2011 | |

OTHER PUBLICATIONS

Gulotty, R.J., et al., Run parameters for a continuous hydrogenation process using ACMC-Pd to replace commercial batch rector processes, Organic Process Research & Development, 22, pp. 1622-1627 (Year: 2018).*

(Continued)

*Primary Examiner* — Yate' K Cutliff
(74) *Attorney, Agent, or Firm* — Eversheds Sutherland (US) LLP

(57) ABSTRACT

Methods of catalytic hydrogenation, including methods that may be used to hydrogenate an unsaturated reactant to produce an at least partially saturated product that may be a solid at 20° C. Systems for catalytic hydrogenation that may include a reactor bed containing one or more activated carbon monolith catalysts. At least 97% of unsaturated bonds may be saturated by the methods and systems.

18 Claims, 5 Drawing Sheets

(56) References Cited

U.S. PATENT DOCUMENTS

| | | | | |
|---|---|---|---|---|
| 4,806,632 | A | * | 2/1989 | McCoy ................. C07H 13/06 |
| | | | | 536/124 |
| 4,847,016 | A | | 7/1989 | Gobel |
| 5,324,871 | A | | 6/1994 | Carduck et al. |
| 5,527,866 | A | | 6/1996 | Corrigan et al. |
| 5,783,514 | A | * | 7/1998 | Schick ................. B01J 37/0207 |
| | | | | 502/185 |
| 6,107,433 | A | | 8/2000 | Petrovic et al. |
| 6,998,507 | B1 | | 2/2006 | Ding et al. |
| 7,741,501 | B2 | | 6/2010 | Wuerkert et al. |
| 9,487,711 | B2 | * | 11/2016 | Davis ....................... C10G 3/50 |
| 9,637,389 | B2 | * | 5/2017 | Mitchell, Sr. ............ B01J 23/44 |
| 9,783,745 | B2 | | 10/2017 | Corvaisier et al. |
| 10,208,271 | B2 | | 2/2019 | Borsotti et al. |

OTHER PUBLICATIONS

Simkova, I. L., et al., Hydrogenation of vegetable oils over PD on nanocomposite carbon catalyst, Ind. Eng. Chem. Res., vol. 47, No. 19, pp. 7219-7225 (Year: 2008).*

Yalcin, H., et al., Effect of oil type and fatty acid composition dynamic and steady sear rheology of vegetable oils, Journal of oleo science, 61(4), 181-187 (Year: 2012).*

\* cited by examiner

HYDROGENATION OF OLEOCHEMICAL DERIVATIVES AND SYSTEMS

CROSS-REFERENCE TO RELATED APPLICATIONS

This application claims priority to U.S. Provisional Patent Application No. 63/129,502, filed Dec. 22, 2020, which is incorporated herein by reference.

BACKGROUND

Oleochemicals and derivatives can include a number of products, such as bio-mass based resin products, which may be used in a number of useful formulations, including, but not limited to, paints, coatings, composites, adhesives, lubricants, etc.

Some oleochemicals or derivatives have a molecular weight per unsaturated bond that is relatively large (e.g., about 200 g/mol). As a result, some oleochemicals can be a liquid at room temperature prior to hydrogenation, and a solid at room temperature upon partial or complete hydrogenation. Such a product is typically very viscous (e.g., a product may have a viscosity>7,000 cP at 20° C.), which presents one or more difficulties, such as separating a catalyst or other material from the product and/or subjecting the product to further processing. The further processing may include passing a very viscous product through a reactor one or more additional times in order to increase its degree of hydrogenation.

Known apparatuses and processes of catalytic hydrogenation, such as those disclosed by European Patent Publication No. 2380953, can experience catalyst deactivation and/or dissolution of a catalyst into a product. When a product has relatively high viscosity, removing a catalyst from a product can be difficult, if not impossible. For example, nickel-based catalysts have been used to hydrogenate unsaturated moieties in oleochemicals for food and industrial materials applications. The nickel-based catalysts, however, can exhibit deactivation and leaching into the products over time. Some known apparatuses and processes of catalytic hydrogenation, such as those disclosed by U.S. Pat. No. 5,324,871, require the use of a relatively large stoichiometric excess of hydrogen (e.g., about 10× to 100×) to cool the process fluid to reduce the likelihood of catalyst degradation.

Some oleochemicals can degrade when subjected to certain temperatures (e.g., >220° C.), including temperatures that may be required to conduct a hydrogenation process at a commercially viable rate.

There remains a need for improved devices and methods for the hydrogenation of materials, such as oleochemicals and derivatives thereof, including materials that may convert from a liquid to a solid (e.g., at room temperature) upon partial or complete hydrogenation.

BRIEF SUMMARY

Provided herein are systems and methods for catalytic hydrogenation, including systems and methods that can effectively and/or efficiently hydrogenate materials, such as oleochemicals and derivatives thereof, that may convert from a liquid to a solid (e.g., at room temperature) upon partial or complete hydrogenation.

In some embodiments, the systems and methods herein (i) can achieve a desired degree of hydrogenation (e.g., a conversion of at least 97%, as described herein) in a single pass through a reactor bed, (ii) do not require a catalyst to be separated from a hydrogenated product, including products having a relatively high viscosity, (iii) use a relatively small stoichiometric excess of hydrogen (e.g., about 1.25× to about 2.5×), which may permit better heat management and/or reduce the likelihood of product degradation, (iv) allow control over a degree of hydrogenation achieved, (v) allow relatively high selectivity to be achieved (e.g., iodine values of less than 5, or 3 or less), (vi) maintain a uniform isothermal temperature at the highest temperature at which a reactant/product does not degrade, (vii) reduce or eliminate catalyst degradation, (viii) permit oleochemical feedstocks having a relatively high viscosity (e.g., >30 cP, or about 30 cP to about 400 cP) to be processed with relative ease, (ix) reduce thermal degradation of the oleochemical derivative, or (x) a combination thereof. For example, oleochemical feedstocks that are solids at room temperature (e.g., those having melting points less than 100° C.) can be processed with relative ease with the methods and systems described herein. As a further example, the products obtained from the methods and systems described herein may contain no (or minimal) residual catalyst particles and/or dissolved metals from a catalyst. The products obtained from the methods and systems described herein may exhibit no (or minimal) evidence of degradation to by-products.

In one aspect, methods of catalytic hydrogenation are provided. In some embodiments, the methods include providing a first stream including a reactant, wherein the reactant (i) includes one or more unsaturated bonds, (ii) is a liquid, and (iii)(a) has a viscosity of at least 30 cP (20° C.), at least 50 cP (20° C.), or at least 100 cP (20° C.), (b) is a compound according to formula (I), or (c) a combination thereof; providing a second stream including hydrogen; providing a reactor bed having a first end and a second end, wherein the reactor bed includes an activated carbon monolith catalyst including (a) a porous finished activated carbon monolith having walls defining at least one passage therethrough and including a supporting ceramic matrix and substantially discontinuous activated carbon particles dispersed throughout the supporting ceramic matrix, the walls having an exterior surface, depth, and passageways into the depth of the walls, and (b) at least one active catalytic material on said porous finished-activated carbon monolith, the at least one active catalytic material applied to the porous finished activated carbon monolith and disposed on the exterior surface of the walls and within the passageways into the depth of the monolith walls of the porous finished activated carbon monolith; disposing, at least once, the first stream and the second stream in the first end of the reactor bed to contact the first stream and the second stream in the at least one passage of the activated carbon monolith catalyst to convert at least 97% of the one or more unsaturated bonds to one or more saturated bonds; and optionally collecting a product that exits the second end of the reactor bed, wherein the product (i) includes the one or more saturated bonds, (ii) is a solid at 20° C., or (iii) a combination thereof.

Also provided herein are systems for catalytic hydrogenation. Embodiments of the systems may be used to perform the methods described herein.

Additional aspects will be set forth in part in the description which follows, and in part will be obvious from the description, or may be learned by practice of the aspects described herein, or derived from targeted research work. The advantages described herein may be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1A:
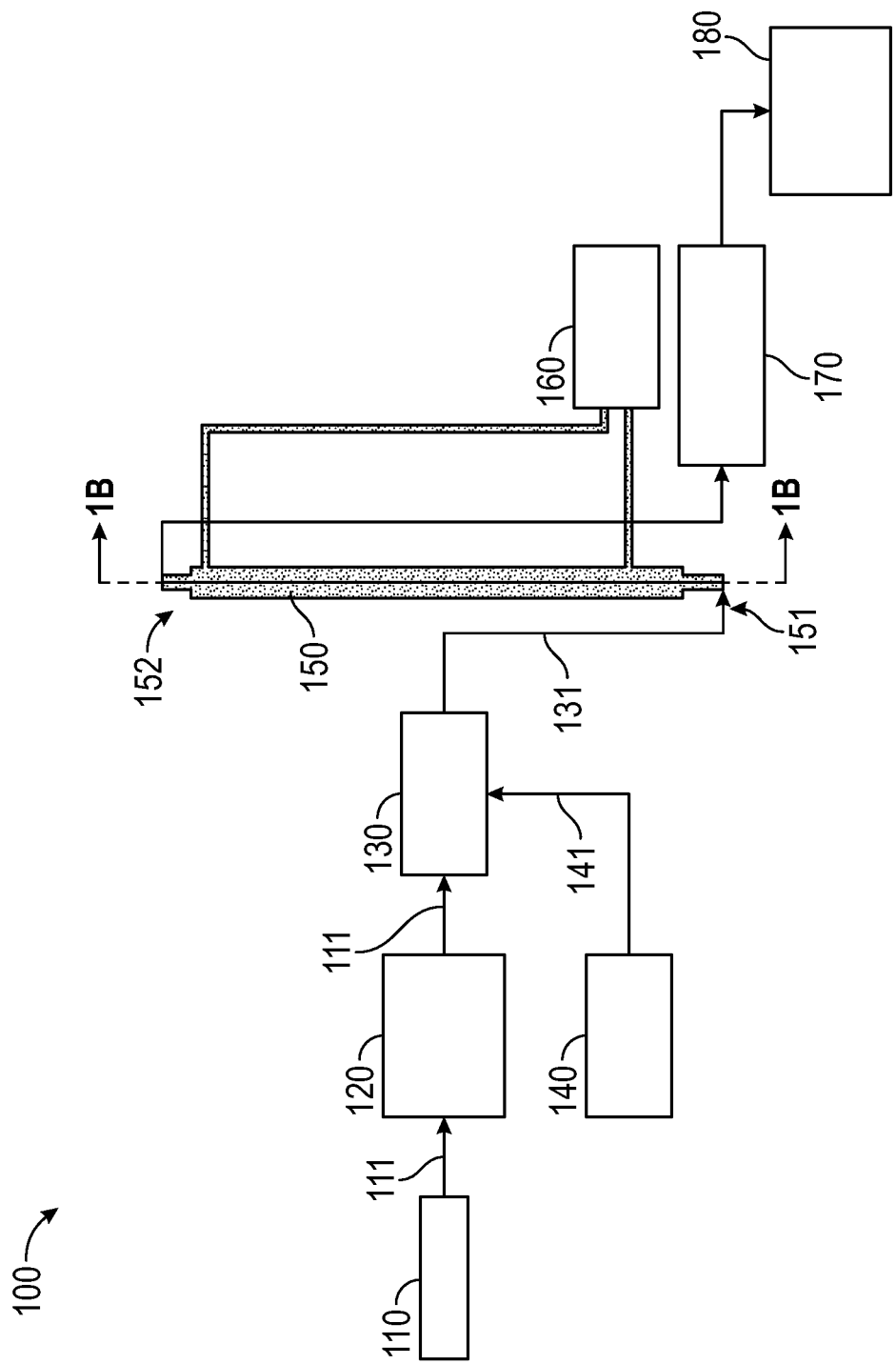
FIG. 1A depicts an embodiment of a system, which may be used in the methods described herein.

Provided herein are systems and methods for catalytic hydrogenation.

First Stream

In some embodiments, the methods herein include providing a first stream that includes a reactant. The reactant subjected to the methods described herein may be a neat reactant; in other words, the first stream consists of a reactant. The first stream may include a material other than the reactant, such as a liquid in which the reactant is at least partially dissolved or dispersed. The material other than the reactant may include any material that does not undesirably impact hydrogenation.

The providing of a first stream may be achieved using any equipment known in the art. A first stream, for example, may be disposed in a reservoir of any kind, and/or transported with a pump, such as a high-performance liquid chromatography (HPLC) pump. A pump may be used to provide a first stream at a desired flow rate, as described herein.

A reactant may be a compound that includes one or more unsaturated bonds. A reactant may be a compound that is a liquid, such as a liquid at 20° C., and includes one or more unsaturated bonds. A reactant may be a compound that includes one or more unsaturated bonds, and has a viscosity of at least 50 cP (20° C.), or at least 100 cP (20° C.). A reactant may be a compound of formula (I), as described herein. A compound of formula (I) may be a liquid, and/or have a viscosity of at least 50 cP (20° C.), or at least 100 cP (20° C.). A reactant is a "liquid" when the reactant has a melting point at or below reactor temperature.

A reactant may (i) include one or more unsaturated bonds, (ii) be a liquid (such as a liquid at 20° C.), (iii) (a) have a viscosity of at least 50 cP (20° C.), or at least 100 cP (20° C.), (b) be a compound of formula (I), or (c) a combination thereof, or (iv) any combination thereof. For example, a reactant may include 1 to 20, 1 to 15, 1 to 10, 1 to 5, 5 to 20, 10 to 20, or 15 to 20 unsaturated bonds per molecule. When, for example, a reactant includes 12 unsaturated bonds per molecule, then the molecule may be described herein as including "12 moles of unsaturated bonds per molecule".

The one or more unsaturated bonds may include any non-single bond, such as a double bond, a triple bond, or any combination thereof.

A reactant may include a biomass-based reactant, such as a biomass-based resin product. In some embodiments, a reactant is derived from sugar, an oil, or a combination thereof. Non-limiting examples of oils include vegetable oils, such as corn oil, soybean oil, canola oil, olive oil, etc. In some embodiments, the reactant includes a sucrose octaester. In some embodiments, the reactant includes a sucrose octasoyate.

In some embodiments, a reactant includes a compound of formula (I):

$$R^1—[OCO—R^2]_t \qquad (I);$$

wherein t is 1 to 10; $R^1$ and $R^2$ are independently selected from a $C_1$-$C_{30}$ hydrocarbyl, $C_1$-$C_{20}$ hydrocarbyl, $C_1$-$C_{10}$ hydrocarbyl, or $C_1$-$C_6$ hydrocarbyl; and at least one of $R^1$ and $R^2$ includes one or more unsaturated bonds. In some embodiments, $R^1$ includes at least one unsaturated bond. In some embodiments, $R^2$ includes at least one unsaturated bond. In some embodiments, $R^1$ and $R^2$ include at least one unsaturated bond.

When t is 2 or greater in formula (I), then each $R^2$ is independently selected from a $C_1$-$C_{30}$ hydrocarbyl, $C_1$-$C_{20}$ hydrocarbyl, $C_1$-$C_{10}$ hydrocarbyl, or $C_1$-$C_6$ hydrocarbyl. In other words, when more than one $R^2$ is present in a compound of formula (I), each $R^2$ may be the same or different. For example, if there are two $R^2$ groups in a compound of formula (I), then the first and second $R^2$ may be the same (e.g., methyl) or different (e.g., methyl and ethyl). As a further example, if there are three $R^2$ groups in a compound of formula (I), then the first, second, and third $R^2$ may be the same (e.g., methyl, methyl, methyl), different (e.g., methyl, ethyl, propenyl), or a combination thereof (e.g., methyl, propenyl, propenyl).

In some embodiments, $R^1$ is selected from a $C_1$-$C_{30}$ hydrocarbyl, $C_1$-$C_{20}$ hydrocarbyl, $C_1$-$C_{10}$ hydrocarbyl, or $C_1$-$C_6$ hydrocarbyl derived from a polyhydric alcohol. Non-limiting examples of polyhydric alcohols include glycerine, propylene glycol, butane diol, glucose, sucrose, and other carbohydrates.

In some embodiments, $R^2$ is selected independently from a $C_1$-$C_{30}$ hydrocarbyl, $C_1$-$C_{20}$ hydrocarbyl, $C_1$-$C_{10}$ hydrocarbyl, or $C_1$-$C_6$ hydrocarbyl derived from a fatty acid and/or fatty acid esters containing mono-unsaturated and/or poly-unsaturated double bonds, such as capric, lauric, palmitic, stearic, linoleic, linolenic, or oleic acid and acid esters.

In some embodiments, a reactant has a molecular weight of about 100 g/mol to about 3,000 g/mol, about 500 g/mol to about 3,000 g/mol, about 1,000 g/mol to about 3,000 g/mol, or about 2,000 g/mol to about 3,000 g/mol.

In some embodiments, a reactant has a viscosity of at least 30 cP (20° C.), at least 40 cP (20° C.), at least 50 cP (20° C.), at least 100 cP (20° C.), at least 150 cP (20° C.), at least 200 cP (20° C.), at least 250 cP (20° C.), at least 300 cP (20° C.), at least 350 cP (20° C.), or at least 400 cP (20° C.).

Non-limiting examples of reactants that may be present in a first stream are disclosed at U.S. Pat. Nos. 4,133,822, 4,385,001, 4,510,092, 4,847,016, 5,527,866, 6,107,433, 6,998,507, 7,741,501, 9,487,711, 9,783,745, and 10,208,271.

The phrases "$C_1$-$C_{30}$ hydrocarbyl", "$C_1$-$C_{20}$ hydrocarbyl", and the like, as used herein, generally refer to aliphatic, aryl, or arylalkyl groups containing 1 to 30 carbon atoms, 1 to 20 carbon atoms, and the like, including substituted derivatives thereof. Examples of aliphatic groups, in each instance, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each instance having 1 to 30 carbon atoms. Examples of alkyl groups include, but are not limited to, methyl, ethyl, propyl, isopropyl, n-butyl, t-butyl, isobutyl, pentyl, hexyl, isohexyl, heptyl, 4,4-dimethylpentyl, octyl, 2,2,4-trimethylpentyl, nonyl, decyl, undecyl and dodecyl. Cycloalkyl moieties may be monocyclic or multicyclic, and examples include cyclopropyl, cyclobutyl, cyclopentyl, cyclohexyl, and adamantyl. Additional examples of alkyl moieties have linear, branched and/or cyclic portions (e.g., 1-ethyl-4-methyl-cyclohexyl). Representative alkenyl moieties include vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, 1-hexenyl, 2-hexenyl, 3-hexenyl, 1-heptenyl, 2-heptenyl, 3-heptenyl, 1-octenyl, 2-octenyl, 3-octenyl, 1-nonenyl, 2-nonenyl, 3-nonenyl, 1-decenyl, 2-decenyl and 3-decenyl. Representative alkynyl moieties include acetylenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl and 9-decynyl. Examples of aryl or arylalkyl moieties include, but are not limited to, anthracenyl, azulenyl, biphenyl, fluorenyl, indan, indenyl, naphthyl, phenanthrenyl, phenyl, 1,2,3,4-tetrahydro-naphthalene, anthracenyl, tolyl, xylyl, mesityl, benzyl, and the like, including any heteroatom substituted derivative thereof.

Unless otherwise indicated, the term "substituted," when used to describe a chemical structure or moiety, refers to a derivative of that structure or moiety wherein (i) a multi-valent non-carbon atom (e.g., oxygen, nitrogen, sulfur, phosphorus, etc.) is bonded to one or more carbon atoms of the chemical structure or moiety (e.g., a "substituted" $C_4$ hydrocarbyl may include, but is not limited to, diethyl ether moiety, a methyl propionate moiety, an N,N-dimethylacetamide moiety, a butoxy moiety, etc., and a "substituted" aryl $C_{12}$ hydrocarbyl may include, but is not limited to, an oxydibenzene moiety, a benzophenone moiety, etc.) or (ii) one or more of its hydrogen atoms (e.g., chlorobenzene may be characterized generally as an aryl $C_6$ hydrocarbyl "substituted" with a chlorine atom) is substituted with a chemical moiety or functional group such as alcohol, alkoxy, alkanoyloxy, alkoxycarbonyl, alkenyl, alkyl (e.g., methyl, ethyl, propyl, t-butyl), alkynyl, alkylcarbonyloxy (—OC(O)alkyl), amide (—C(O)NH-alkyl- or -alkylNHC(O)alkyl), tertiary amine (such as alkylamino, arylamino, arylalkylamino), aryl, aryloxy, azo, carbamoyl (—NHC(O)O-alkyl- or —OC(O)NH-alkyl), carbamyl (e.g., $CONH_2$, as well as CONH-alkyl, CONH-aryl, and CONH-arylalkyl), carboxyl, carboxylic acid, cyano, ester, ether (e.g., methoxy, ethoxy), halo, haloalkyl (e.g., —$CCl_3$, —$CF_3$, —$C(CF_3)_3$), heteroalkyl, isocyanate, isothiocyanate, nitrile, nitro, oxo, phosphodiester, sulfide, sulfonamido (e.g., $SO_2NH_2$), sulfone, sulfonyl (including alkylsulfonyl, arylsulfonyl and arylalkylsulfonyl), sulfoxide, thiol (e.g., sulfhydryl, thioether) or urea (—NHCONH-alkyl-).

Second Stream

In some embodiments, the methods herein include providing a second stream that includes hydrogen. The hydrogen subjected to the methods described herein may be pure hydrogen; in other words, the second stream consists of hydrogen. The second stream may include a material other than hydrogen, such as a gas other than hydrogen. The material other than hydrogen may include any material that does not undesirably impact hydrogenation.

In some embodiments, the hydrogen of a second stream includes ultra-high pure (UHP) hydrogen. Commercially-available bottles of hydrogen, such as UHP hydrogen or industrial grade hydrogen, may be used in the systems and methods described herein.

The providing of the second stream may be achieved using any equipment known in the art. A second stream, for example, may be disposed in a container of any kind, and/or transported with a pump or controller, such as a mass flow controller. A mass flow controller may be used to provide a second stream at a desired flow rate, as described herein.

Upon exiting a second end of a reactor bed, a second stream or the hydrogen of a second stream may be vented, recycled, or a combination thereof. When recycled, the hydrogen may contact an additional portion of the first stream.

Reactor Bed

The methods described herein may include providing a reactor bed having a first end and a second end, wherein the reactor bed includes an activated carbon monolith catalyst.

A reactor bed may be oriented at any one or more positions during the methods described herein. In some embodiments, the first end and the second end of the reactor bed are arranged at a first position and a second position, respectively, such that after the disposing of the first stream in the first end of the reactor bed, the first stream travels in an up-flow direction to the second end of the reactor bed. In some embodiments, the first end and the second end of the reactor bed are arranged at a first position and a second position, respectively, such that after the disposing of the first stream in the first end of the reactor bed, the first stream travels in a down-flow direction to the second end of the reactor bed. In some embodiments, the reactor bed is arranged vertically. In some embodiments, a reactor bed is arranged at a position such that an angle between a longitudinal axis of the reactor bed and a flat surface of the ground is about 45° to 90°, about 60° to 90°, or about 80° to 90°.

In some embodiments, the reactor bed includes a shell and tube reactor. Any shell and tube reactor known in the art may be used in the systems and methods described herein. The shell and tube reactor may be configured to permit a fluid disposed in a first end of the shell and tube reactor to enter one or more tubes, traverse the tube(s), and exit a second end of the shell and tube reactor. The shell may be configured to permit a fluid, such as a heating or cooling fluid, to (i) be disposed in an inlet, (ii) traverse a space defined by the external surfaces of the tubes and the one or more internal surfaces of the shell, and (ii) exit an outlet. A heating or cooling fluid may be circulated in up-flow mode or down-flow mode by a heater/chiller apparatus. The heating or cooling fluid may include a heat transfer fluid, such as a silicone.

The shell and tube reactor generally may have any dimensions. A shell of a shell and tube reactor, for example, may have a length of at least 1 m, at least 2 m, at least 3 m, at least 4 m, at least 5 m, etc. A shell may have any outer diameter. In some embodiments, a shell of a shell and tube reactor has an outer diameter less than 10 m, less than 5 m, less than 2 m, less than 1 m, less than 0.5 m, less than 0.1 m, less than 0.05 m, etc.

In some embodiments, the inner diameter of the tubes that contain the catalyst of the shell and tube reactor is about 1.6 cm to 8.0 cm, or about 2.5 cm to 5.0 cm. In some embodiments, the shell and tube reactor is a multi-tubular shell and tube reactor, and the inner diameter of the tubes that contain the catalyst of the shell and tube reactor is about 1.6 cm to 8.0 cm, or about 2.5 cm to 5.0 cm.

In some embodiments, the shell and tube reactor is a multi-tubular shell and tube reactor, wherein the tubes include about 0.3 meters to about 15 meters, or about 3 meters to 7 meters of catalyst. In some embodiments, a heat transfer fluid, as described herein, is disposed in the shell and tube reactor to heat and/or maintain a temperature in the reactor of about 80° C. to about 250° C., about 150° C. to about 250°, or about 175° C. to about 220° C., over substantially the entire reactor bed length.

Figure 1B:
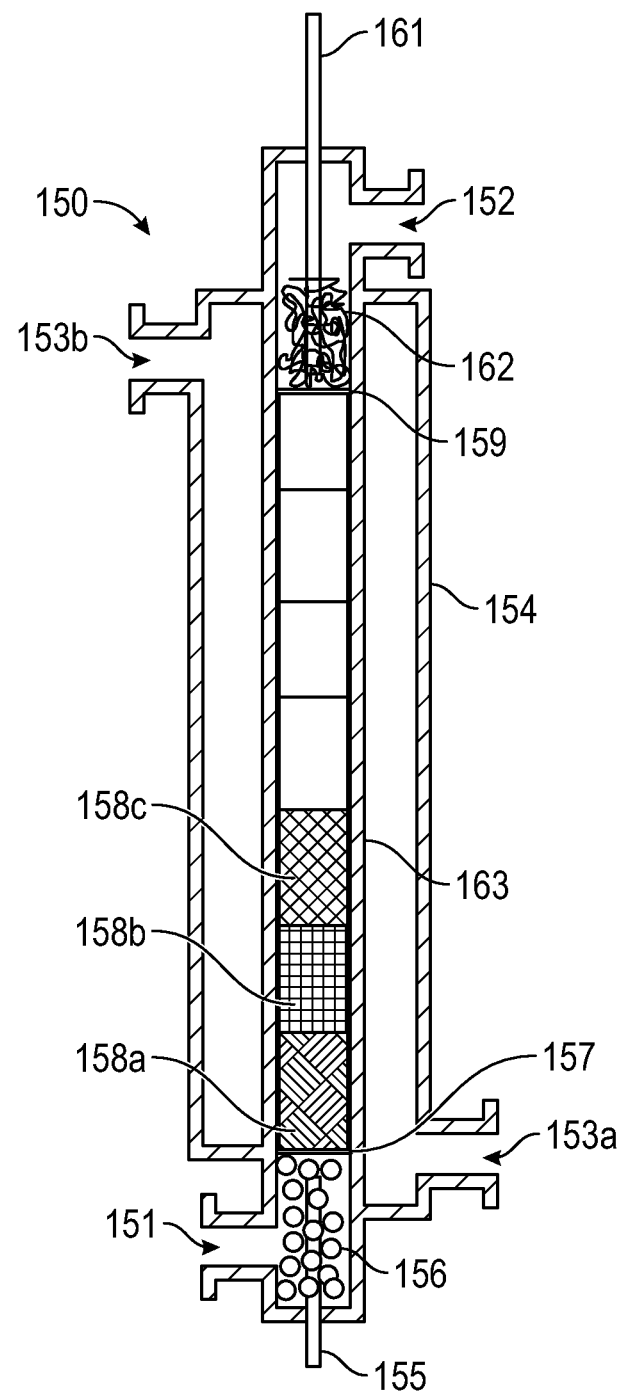
FIG. 1B depicts a cross-sectional view of a component of the system of FIG. 1A.

An example of a shell and tube reactor is depicted herein at FIG. 1A and FIG. 1B. Although the embodiment of a shell and tube reactor depicted at FIG. 1A and FIG. 1B includes one tube, a shell and tube reactor used in the methods and systems described herein may include any number of tubes, e.g., 2 to 500 tubes, etc. (see, e.g., FIG. 5). The number of tubes is generally limited only by the size of the shell and the size of the tubes. Any material capable of withstanding the methods described herein may be used to form a shell and tube reactor. In some embodiments, the shell and/or tubes are formed of a metal, such as stainless steel.

A reactor bed may include one or more features configured to monitor and/or control one or more aspects of the methods described herein, such as temperature, flow rate, pressure, etc. As depicted, for example, at FIG. 1B, a reactor bed may include a thermocouple (155, 161) at a first end of the reactor bed, a second end of the reactor bed, or both the first end and the second end of a reactor bed.

Activated Carbon Monolith Catalysts

A reactor bed may include one or more activated carbon monolith catalysts. For example, one or more activated carbon monolith catalysts may be disposed in the one or more tubes of a shell and tube reactor.

In some embodiments, the activated carbon monoliths include (a) a porous finished activated carbon monolith having walls defining at least one passage therethrough and comprising a supporting ceramic matrix and substantially discontinuous activated carbon particles dispersed throughout the supporting ceramic matrix, the walls having an exterior surface, depth, and passageways into the depth of the walls, and (b) at least one active catalytic material on said porous finished-activated carbon monolith, the at least one active catalytic material applied to the porous finished activated carbon monolith and disposed on the exterior surface of the walls and within the passageways into the depth of the monolith walls of the porous finished activated carbon monolith.

Non-limiting examples of activated carbon monolith catalysts that may be used in the methods and systems described herein include those described in U.S. Pat. No. 9,637,389, which is incorporated herein by reference.

The catalytic material may include any material that is capable of at least partially hydrogenating a reactant. In some embodiments, the catalytic material is selected from the group consisting of a reduced precious metal, a precious metal oxide, a precious metal including a modifier, a base metal, and a combination thereof. The base metal may be selected from the group consisting of zinc, nickel, copper, manganese, iron, chromium, vanadium, cobalt, tungsten, and molybdenum. The modifier may be selected from the group consisting of a potassium hydrated oxide, a potassium hydroxide, a calcium hydrated oxide, a calcium hydroxide, a magnesium hydrated oxide, magnesium hydroxide, a sodium hydrated oxide, and sodium hydroxide.

In some embodiments, the catalytic material is a precious metal selected from the group consisting of palladium, platinum, rhodium, ruthenium, iridium, silver, gold, and any combination thereof.

In some embodiments, the at least one catalytic material, such as at least one precious metal catalytic material, is present on the finished activated carbon monolith in an amount from about 0.01% to about 5.0% by weight of the activated carbon monolith. In some embodiments, the at least one catalytic material is present in the finished activated carbon monolith in an amount of about 0.18 g/L to about 7 g/L, about 0.7 g/L to about 4 g/L, or about 1.8 g/L to about 4 g/L. The activated carbon particles have pores, and, in some embodiments, the catalytic material is at least partially disposed in pores of the activated carbon.

In some embodiments, at least one base metal catalytic material is present on the finished activated carbon monolith in an amount from about 5.0% to about 40.0% by weight of the activated carbon monolith. In some embodiments, the at least one catalytic material is present in the finished activated carbon monolith in an amount of about 18 g/L to about 140 g/L, or about 36 g/L to about 106 g/L. The activated carbon particles have pores, and, in some embodiments, the catalytic material is at least partially disposed in pores of the activated carbon.

In some embodiments, the activated carbon particles are present in the finished activated carbon monolith at an amount from about 20% to about 70%, by weight, of the monolith and the supporting matrix is present in the finished activated carbon monolith at an amount from about 80% to about 30%, by weight, of the finished activated carbon monolith. In some embodiments, the activated carbon particles are present in the finished activated carbon monolith at an amount of about 30% to about 50%, by weight, of the finished activated carbon monolith.

In some embodiments, the activated carbon particles are characterized by a nitrogen B.E.T. surface area from about 600 m$^2$/g to about 2000 m$^2$/g. In some embodiments, the activated carbon particles have a particle size such that more than 40% by weight of the activated carbon passes through a 200 mesh screen.

The activated carbon monolith may be made by any methods known in the art. In some embodiments, the finished activated carbon monolith is made according to a process that includes (i) extruding an extrudable mixture that includes the activated carbon particles, a ceramic forming material, a flux material, and water, (ii) drying the extruded monolith, and (iii) firing the dried monolith at a temperature and for a time period sufficient to fuse the ceramic forming material together and form the ceramic matrix. The flux material may be a feldspathic mineral, such as nepheline syenite. The flux material may include sodium silicate. Non-limiting examples of ceramic forming materials include ball clay, plastic kaolins, smectite clay minerals, bentonite, and combinations thereof. In some embodiments, the ceramic forming material also includes a shrinkage reducing filler material.

In some embodiments, the finished activated carbon monolith catalyst is honeycomb shaped. The finished activated carbon monolith catalyst may have a cylindrical shape. The finished activated carbon monolith catalyst may include one or more axial channels, e.g., one or more passages therethrough. The finished activated carbon monolith catalyst may include a plurality of passages therethrough for receiving a flow of fluid and an open frontal area greater than 50% and up to 85%. The finished activated carbon monolith catalyst may have a diameter of about 1.2 cm to about 10 cm, or about 2.5 cm to "about 5 cm. In some embodiments, the finished activated carbon monolith catalyst includes 15 to 78 cells (e.g., channels or passages) per square cm (CPSC), or 31 to 62 CPSC.

In some embodiments, (i) the activated carbon particles are present in the finished activated carbon monolith at an amount of about 30% to about 50%, by weight, of the finished activated carbon monolith; (ii) the finished activated carbon monolith catalyst includes 15 to 78 CPSC, or 31 to 62 CPSC; (iii) the at least one catalytic material, such as palladium, is present on the finished activated carbon monolith in an amount about 0.18 g/L to about 7 g/L, about 0.7 g/L to about 4 g/L, or about 1.8 g/L to about 4 g/L; (iv) the finished activated carbon monolith catalyst has a cylindrical shape; (v) the finished activated carbon monolith catalyst includes one or more axial channels, e.g., one or more passages therethrough; (vi) the finished activated carbon monolith catalyst has a diameter of about 1 cm to about 10 cm, about 1.2 cm to about 10 cm, about 1.5 cm to about 10 cm, or about 2.5 cm to about 5 cm, or (vii) a combination thereof.

Conversion of Unsaturated Bonds to Saturated Bonds

In some embodiments, the methods herein include disposing, at least once, the first stream and the second stream in the first end of the reactor bed to contact the first stream and the second stream in the at least one passage of the activated carbon monolith catalyst. The disposing of the first stream and the second stream may be performed once (1×) or repeated one or more times (e.g., 2×, 3×, 4×, etc.) to achieve a desired product, such as a product having a conversion of at least 97%, as described herein). When a first stream passes through a reactor bed more than once, the first stream may be contacted with a recycled second stream (e.g., a second stream that has passed through the reactor bed) or a new second stream (e.g., a second stream that has not passed through the reactor bed).

In some embodiments, the disposing of the first stream and the second stream in the first end of the reactor bed to contact the first stream and the second stream in the at least one passage of the activated carbon monolith catalyst includes contacting the first stream and the second stream to form a combined stream, and then disposing the combined stream in the first end of the reactor bed. The contacting of the first stream and the second stream in the at least one passage of the activated carbon monolith catalyst may include mixing the first stream and the second stream before and/or after the first stream and the second stream are disposed in the first end of the reactor bed. The mixing of the first stream and the second stream may be achieved by any technique or equipment known in the art, such as a static mixer, dynamic mixer, a t-joint, etc. Any amount of the first stream may be contacted with any amount of the second stream. For example, if the first stream and a second stream are provided to a static mixer to produce a combined stream, then the first stream and the second stream may be provided to the static mixer, and then the combined stream sent to the reactor. The static mixer may include any static mixer known in the art.

In some embodiments, a first end of a reactor bed includes two inlets, and the disposing of the first stream and the second stream in the first end of the reactor bed includes disposing the first stream in a first inlet, and disposing the second stream in the second inlet. The first stream and the second stream may be disposed in the first inlet and second inlet, respectively, at flow rates effective to achieve the target conversion.

In some embodiments, the first stream is disposed in the first end of the reactor bed at a flow rate of about 0.03 liquid hourly velocity (LHSV) $hr^{-1}$ to about 5.0 LHSV $hr^{-1}$, about 0.03 LHSV $hr^{-1}$ to about 4.0 LHSV $hr^{-1}$, about 0.03 LHSV $hr^{-1}$ to about 3.0 LHSV $hr^{-1}$, about 0.03 LHSV $hr^{-1}$ to about 2.0 LHSV $hr^{-1}$, about 0.03 LHSV $hr^{-1}$ to about 1.0 LHSV $hr^{-1}$. In some embodiments, the first stream is disposed in the first end of the reactor bed at a flow rate of about 0.05 LHSV $hr^{-1}$ to about 5.0 LHSV $hr^{-1}$, about 0.05 LHSV $hr^{-1}$ to about 4.0 LHSV $hr^{-1}$, about 0.05 LHSV $hr^{-1}$ to about 3.0 LHSV $hr^{-1}$, about 0.05 LHSV $hr^{-1}$ to about 2.0 LHSV $hr^{-1}$, about 0.05 LHSV $hr^{-1}$ to about 1.0 LHSV $hr^{-1}$. In some embodiments, the first stream is disposed in the first end of the reactor bed at a flow rate of about 0.1 LHSV $hr^{-1}$ to about 0.5 LHSV $hr^{-1}$.

In some embodiments, the second stream is disposed in the first end of the reactor bed at a flow rate effective to exceed the stoichiometric requirement for complete saturation of the a reactant of a first stream by about 1× to about 3×, about 1× to about 2.5×, about 1× to about 2×, or about 1× to about 1.5×.

In some embodiments, an internal pressure of a reactor bed is about 0.3 MPa to about 3.5 MPa, about 1.5 MPa to about 2.8 MPa, about 1 MPa to about 3.5 MPa, or about 1.8 MPa to about 2.5 MPa. The internal pressure may be imparted by any technique or equipment known in the art, such as a back pressure regulator or other device.

In some embodiments, the methods herein include disposing, at least once, the first stream and the second stream in the first end of the reactor bed to contact the first stream and the second stream in the at least one passage of the activated carbon monolith catalyst to convert at least a portion of the unsaturated bonds to saturated bonds. In some embodiments, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the one or more unsaturated bonds are converted to one or more saturated bonds. In some embodiments, the converting of the at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% of the one or more unsaturated bonds to one or more saturated bonds occurs during a single pass of the first stream through the reactor bed. A conversion percentage may be determined at any point of a method described herein. In some embodiments, the conversion percentage is determined by analyzing a product that exits a second end of a rector bed after one or more passes through the reactor bed. The "converting" herein may be defined by a percentage, which is the percentage of unsaturated bonds in an amount of reactant that is converted to saturated bonds. For example, if an amount of reactant includes 500 molecules, each having 5 saturated bonds, then the amount of reactant includes 2,500 unsaturated bonds, and at least 2,425 of the unsaturated bonds must be converted to saturated bonds in order to achieve a conversion of at least 97%.

Products

In some embodiments, the methods described herein include collecting a product that exits the second end of the reactor bed. A product may be collected using any technique or equipment known in the art, such as a liquid-gas separator, knock-out pot, product collection drum, etc.

The products may include one or more saturated bonds. A product, in some embodiments, is a solid at 20° C. In some embodiments, a product has a viscosity of at least 300 cP (20° C.), at least 325 cP (20° C.), at least 350 cP (20° C.), at least 375 cP (20° C.), at least 400 cP (20° C.), at least 425 cP (20° C.), at least 450 cP (20° C.), at least 475 cP (20° C.), at least 500 cP (20° C.), at least 525 cP (20° C.), at least 550 cP (20° C.), at least 575 cP (20° C.), at least 600 cP (20° C.), at least 625 cP (20° C.), at least 650 cP (20° C.), at least 675 cP (20° C.), or at least 700 cP (20° C.).

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of various embodiments, applicants in no way disclaim these technical aspects, and it is contemplated that the present disclosure may encompass one or more of the conventional technical aspects discussed herein.

The present disclosure may address one or more of the problems and deficiencies of known methods and processes. However, it is contemplated that various embodiments may prove useful in addressing other problems and deficiencies in a number of technical areas. Therefore, the present disclosure should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

In the descriptions provided herein, the terms "includes," "is," "containing," "having," and "comprises" are used in an open-ended fashion, and thus should be interpreted to mean "including, but not limited to." When methods or systems are claimed or described in terms of "comprising" various steps or components, the methods or systems can also "consist essentially of" or "consist of" the various steps or components, unless stated otherwise.

The terms "a," "an," and "the" are intended to include plural alternatives, e.g., at least one. For instance, the disclosure of "a tube," "a reactant," "a stream", and the like, is meant to encompass one, or mixtures or combinations of more than one tube, reactant, stream, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified.

Moreover, all numerical end points of ranges disclosed herein are approximate. As a representative example, Applicant discloses, in some embodiments, the first stream is disposed in the first end of the reactor bed at a flow rate of about 0.1 LHSV hr$^{-1}$ to about 0.5 LHSV hr$^{-1}$. This range should be interpreted as encompassing about 0.1 LHSV hr$^{-1}$ and about 0.5 LHSV hr$^{-1}$, and further encompasses "about" each of 0.2 LHSV hr$^{-1}$, 0.3 LHSV hr$^{-1}$, and 0.4 LHSV hr$^{-1}$, including any ranges and sub-ranges between any of these values.

As used herein, the term "about" means plus or minus 10% of the numerical value of the number with which it is being used.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of a Tube Hydrogenation Reactor System

In this example, an embodiment of a tube hydrogenation reactor system was prepared, and an embodiment of a reactant liquid was hydrogenated using the system.

The embodiment of a tube hydrogenation reactor system 100 prepared in this example is depicted at FIG. 1A and FIG. 1B.

The system 100 included a hydrogen source 110, which provided ultra high purity (UHP) hydrogen 111 to a mass flow controller 120. The mass flow controller 120 provided the UHP hydrogen 111 to a static mixer 130. The static mixer 130 also received a liquid reactant 141 from a liquid reactant source 140. The liquid reactant 141 was provided, in this example, by a high-performance liquid chromatography (HPLC) pump (not shown). In this example, the liquid reactant 141 was a neat liquid reactant.

The UHP hydrogen 111 and neat reactant liquid 141 were passed through the static mixer 130 to produce a combined stream 131, which was then forwarded to the first end 151 of the reactor bed 150. The reactor bed 150 of this example was a vertical 3.4 m tall shell 154 and tube 163 reactor. The tube 163 had an internal diameter of about 3 cm, and was a schedule 40 stainless steel tube. The shell 154 had an outer diameter of about 5.7 cm.

The system 100 also included a heater/chiller 160, which circulated, in up-flow mode, a C20 silicone heat transfer fluid through the reactor bed 150 via inlet 153a and outlet 153b. The system 100 also included a back pressure regulator 170, and a product collection drum 180.

The combined stream 131, which included reactant liquid 141, was provided to the reactor bed 150 in up-flow mode, i.e., the reactant liquid entered the reactor bed 150 at the first end 151 and exited the reactor bed 150 at the second end 152.

The gas manifold of this example was previously described in the literature (see, e.g., Mcintosh, S. L.; Herkes, F. E.; and Keller, J. H., "Activated carbon monolith catalysts (ACMC): A New and Novel Catalyst System," *Top. Catal.* 2010, 53, 1091-1095; and Gulotty, R. J.; Rish, S.; Boyd, A.; Mitchell, L. M.; Plageman, S.; McGill, C.; Keller, J.; Starnes, J.; Stadalsky, J.; and G. Garrison, "Run parameters for a Continuous Hydrogenation Process Using ACMC-Pd to Replace Commercial Batch Reactor Processes," *Org.*

*Process Res. Dev.* 2018, 22, 1622-1627). The apparatus was adapted to feed the shell and reactor tube of this example.

In this example, a portion of the combined stream 131 contacted an internal thermocouple 155. The thermocouple was surrounded by a 15 cm depth of stainless-steel balls 156 (3 mm diameter) in an effort to improve heat transfer in the empty tube around the thermocouple. The stainless steel balls 156 were separated from the catalyst with a 20-mesh stainless steel screen 157 to separate the beads from the catalyst. In this example, the steel screen 157 at least partially supported the stack of monoliths in the reactor.

Figure 2:
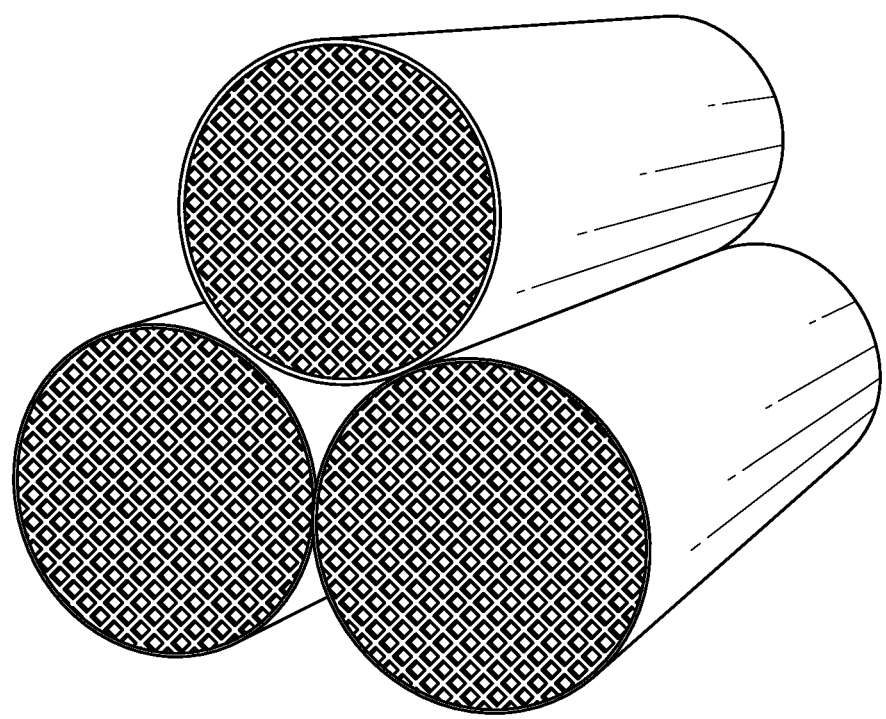
FIG. 2 depicts an embodiment of an activated carbon monolith catalyst that may be used in the systems and methods described herein.

The catalyst used in this example was an activated carbon monolith catalyst including palladium (Pd)(36 CPSC), as described in U.S. Pat. No. 9,637,389, which is incorporated herein by reference. In this example, a 2.3 m bed length of catalyst was used, which included 2.9 cm (diameter)×9.0 cm (length) cylindrical monoliths (158*a*, 158*b*, 158*c*) packed in a reactor tube 163 with random radial cell orientation. Although three cylindrical monoliths are depicted at FIG. 1B for clarity, the 2.3 m bed of this example included a number of the cylindrical monoliths effective to span most, if not all, of the distance between the two screens (157, 159). Three of the cylindrical monoliths used in this example are depicted at FIG. 2.

Above the catalyst in the reactor 150 was a thermocouple 161 used to measure the outlet temperature of the product liquid. A screen 159 separated the thermocouple and the catalyst, and the thermocouple was surrounded by stainless steel wool 162 to aid heat transfer.

The hydrogenated product and hydrogen not consumed in the reaction exited the second end 152 of the reactor 150. At the reactor outlet at the second end 152 was a 1.0-2.0 MPa check valve used as a back-pressure regulator 170 to control the reactor pressure at about 2.1+/−0.4 MPa. After the check valve, the product was separated from the hydrogen effluent using a 19 L knock-out pot 180. The excess hydrogen was vented, remediated, or recycled.

In this example, the following variables were varied within the ranges shown at the following table:

| Variable | Tested Range |
| --- | --- |
| Liquid Flow Rate | about 2 mL/minute to about 10 mL/minute |
| Hydrogen Flow Rate | about 1200 to about 2200 sccm |
| Shell Temperature | about 175° C. to about 205° C. |
| Heating Fluid | about 200° C. to about 220° C. |
| Back Pressure Regulator | about 200 psi to about 350 psi |

In one test of this example, the liquid flow rate was 7 mL/minute, the hydrogen flow rate was 2000 standard cubic centimeters per minute (sccm), the shell temperature was 210° C., the heat fluid control temperature was 220° C., and the reactor pressure was about 1.9 MPa to 2.4 MPa. In one test, evidence of decomposition (e.g., a brown color) was observed when the fluid control temperature was at or above 225° C.

Example 2—Performance of Tube Hydrogenation Reactor System

Portions of the solid product produced by the system of Example 1 were analyzed for iodine value, and these values were used to estimate the degree of conversion of the unsaturated bonds. The product showed low iodine levels of 5 or less. The hydrogenated product was a white hard solid that was brittle and could be broken into chunks by mechanical means.

As explained at Example 1, tests were run over a range of shell/oil temperatures in both down-flow and up-flow mode. In the down-flow mode, the conversion was variable, ranging from about 86% to about 97%. This variability may have been due to shortening of the residence time, due to gravity.

Figure 3:
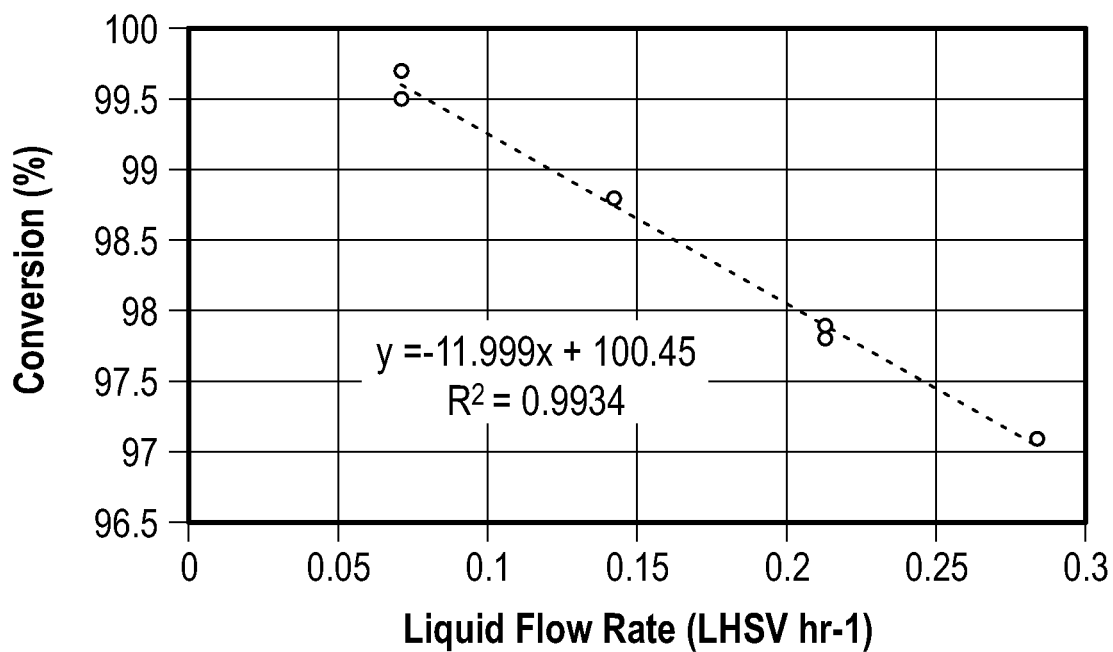
FIG. 3 depicts a plot of conversion percentage versus liquid flow rate for an embodiment of a method described herein.

In up-flow mode, a higher residence time was achieved, and very reproducible conversions of about 97% to about 99% were achieved. A plot of conversion versus liquid flow rate (LHSV hr$^{-1}$) is depicted at FIG. 3. More details are provided by the following table:

| Data of liquid flow rate versus conversion | | | |
| --- | --- | --- | --- |
| Liquid Flow Rate (mL/min) | LHSV hr$^{-1}$ | Conversion (%) | Iodine Level |
| 9.2 | 0.28 | 97.1 | 1.46 ± 0.1250 |
| 6.9 | 0.21 | 97.8 | 2.91 ± 0.08 |
| 6.9 | 0.19 | 97.9 | 2.69 ± 0.16 |
| 4.6 | 0.14 | 98.8 | 1.61 ± 0.08 |
| 2.3 | 0.071 | 99.5 | 0.67 ± 0.10 |
| 2.3 | 0.071 | 99.7 | 0.41 ± 0.06 |

The trend of FIG. 3 was well fit by a line, with conversion decreasing as the flow rate increased, and the residence time decreased. For example, a run flow rate of 7 mL/min (0.21 LHSV hr$^{-1}$) yielded 98% selectivity for one production run that produced 100 kg of product.

Figure 4:
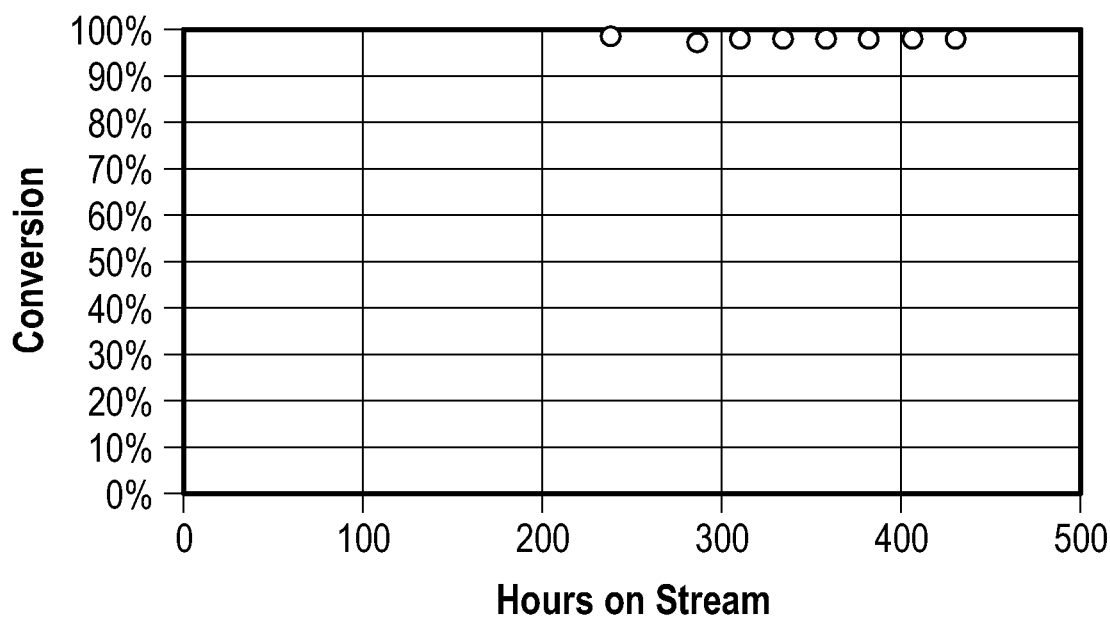
FIG. 4 depicts conversion percentages at different times on stream at a 0.2 LHSV $hr^{-1}$ nominal flow for an embodiment of a method described herein.

An initial measure of the catalyst stability was conducted by comparing the conversion measured with run time at 0.2 LHSV hr$^{-1}$ nominal flow, as shown at FIG. 4. For situations in which the flow conditions changed, the run time was counted, even though the flow rate was lower or higher.

In the tests of Example 1, the hydrogen flow rate was kept at a level effective to ensure a stoichiometric excess of hydrogen. Most tests of Example 1 were run at about 2 times the stoichiometric amount of hydrogen needed.

The results of this example demonstrated that a 99% conversion could be achieved in a single pass through a 11' reactor bed containing the ACMC-Pd-100-101C catalyst in up-flow mode. The production run conditions used to make 100 kg of product with 98%+/−0.5% selectivity to the hydrogenated product was achieved using run conditions of 220° C. hot oil temperature, 300 psi+/−50 psi, and an LHSV of 0.2 hr$^{-1}$. The catalyst showed no evidence of deactivation after a run time of 1000 hours.

Example 3—Estimating Number of Tubes Needed to Achieve a Desired Production Rate Using the results of Examples 1 and 2, the number of tubes needed for a given amount of production in a commercial reactor including similar reactor tubes (29 mm i.d., 3 m catalyst bed length) was estimated.

Figure 5:
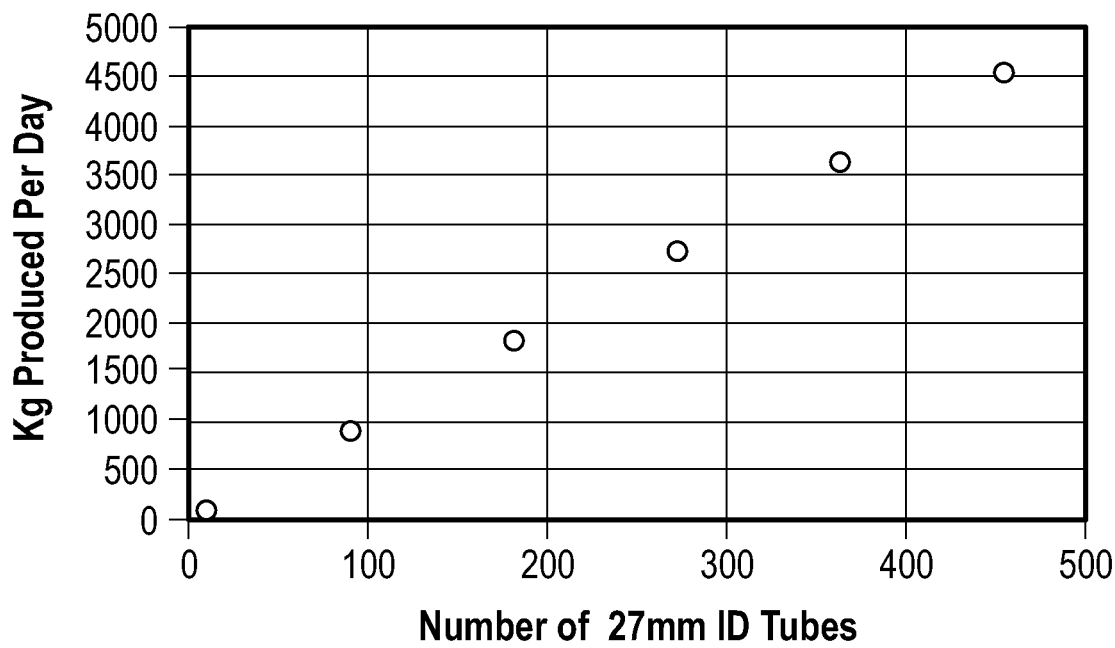
FIG. 5 depicts a plot of the estimated number of tubes needed in an embodiment of a shell and tube reactor to produce certain amounts of product per day.

A flow rate above 7 mL/min corresponded to a productivity of about 10 kg/day. In FIG. 5, the estimated number of tubes needed for a given daily productivity is depicted. For example, to produce 1 ton of product per day would require a reactor of 91 tubes. Increasing the reactor tube length would allow higher liquid flow rates and increase the productivity.

Figure 6:
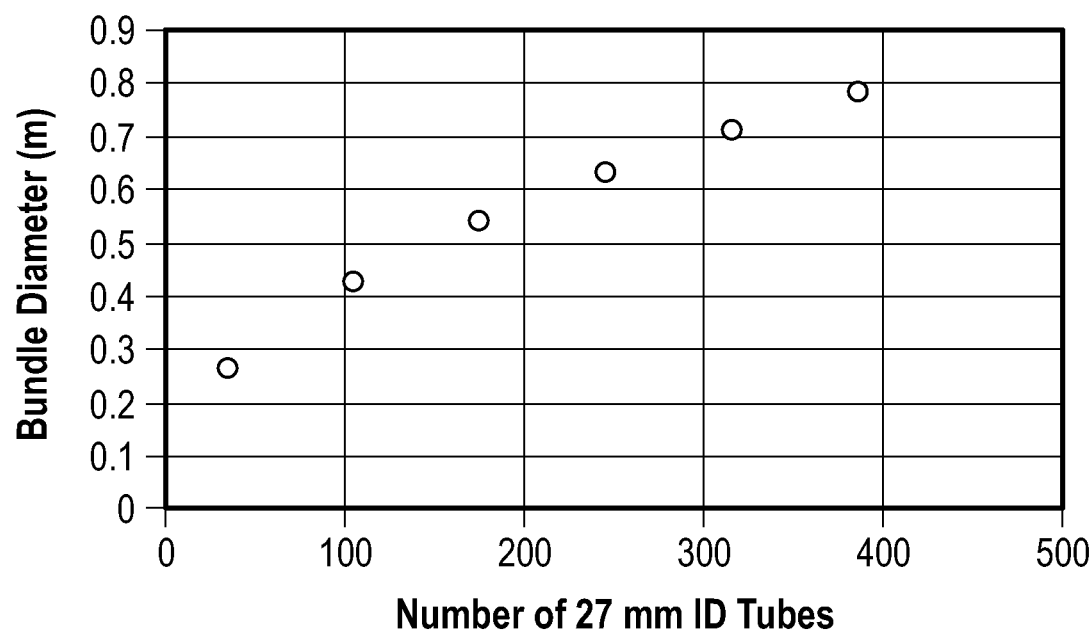
FIG. 6 depicts a plot of the estimated bundle diameter versus the number of tubes for an embodiment of a reactor bed described herein.

There are practical limitations to shell diameter, so it was useful to consider the shell diameter required for a given number of reactor tubes. Using front-end engineering data for this process, the shell diameter versus tube number was calculated, as depicted at FIG. 6.

From the data of this example, an initial commercial reactor size could be estimated. For example, to produce 4 ton of product per day (~3 million lbs/year), a reactor of 364 tubes (3 m catalyst bed and 3.0 cm I.D.) would be required, and this reactor would have a shell diameter of 0.8 m.

The invention claimed is:

1. A method of catalytic hydrogenation, the method comprising:
providing a first stream comprising a reactant, wherein the reactant (i) comprises one or more unsaturated bonds, (ii) is a liquid, and (iii)(a) has a viscosity of at least 30 cP (20° C.), (b) is a compound of formula (I), or (c) a combination thereof, wherein the compound of formula (I) has a structure according to the following formula—

$$R^1\text{—[OCO—}R^2]_t \qquad (I),$$

wherein t is 1 to 10; $R^1$ and $R^2$ are independently selected from a $C_1$-$C_{30}$ hydrocarbyl; and
$R^1$, $R^2$, or $R^1$ and $R^2$ includes one or more unsaturated bonds;
providing a second stream comprising hydrogen;
providing a reactor bed having a first end and a second end, wherein the reactor bed comprises an activated carbon monolith catalyst comprising
  (a) a porous finished activated carbon monolith having walls defining at least one passage therethrough and comprising a supporting ceramic matrix and substantially discontinuous activated carbon particles dispersed throughout the supporting ceramic matrix, the walls having an exterior surface, depth, and passageways into the depth of the walls, and
  (b) at least one active catalytic material on said porous finished-activated carbon monolith, the at least one active catalytic material applied to the porous finished activated carbon monolith and disposed on the exterior surface of the walls and within the passageways into the depth of the monolith walls of the porous finished activated carbon monolith; and
disposing, at least once, the first stream and the second stream in the first end of the reactor bed to contact the first stream and the second stream in the at least one passage of the activated carbon monolith catalyst to convert at least 97% of the one or more unsaturated bonds to one or more saturated bonds, wherein the first stream is disposed in the first end of the reactor bed at a flow rate of about 0.03 LHSV hr$^{-1}$ to about 5.0 LHSV hr$^{-1}$.

2. The method of claim 1, further comprising collecting a product that exits the second end of the reactor bed, wherein the product (i) comprises the one or more saturated bonds, (ii) is a solid at 20° C., or (iii) a combination thereof.

3. The method of claim 1, wherein the converting of the at least 97% of the one or more unsaturated bonds to one or more saturated bonds occurs during a single pass of the first stream through the reactor bed.

4. The method of claim 1, wherein the first end and the second end of the reactor bed are arranged at a first position and a second position, respectively, such that after the disposing of the first stream in the first end of the reactor bed, the first stream travels in an up-flow direction to the second end of the reactor bed.

5. The method of claim 1, wherein an internal pressure of the reactor bed is about 0.3 MPa to about 3.5 MPa.

6. The method of claim 1, wherein the first stream is disposed in the first end of the reactor bed at a flow rate of about 0.1 LHSV hr$^{-1}$ to about 0.5 LHSV hr$^{-1}$.

7. The method of claim 1, wherein the second stream is disposed in the first end of the reactor bed at a flow rate effective to achieve a hydrogen to unsaturated bond mole ratio of about 1 to about 3.

8. The method of claim 1, wherein the second stream is disposed in the first end of the reactor bed at a flow rate effective to achieve a hydrogen to unsaturated bond mole ratio of about 1.25 to about 2.0.

9. The method of claim 1, wherein the reactant is derived from sugar, a vegetable oil, or a combination thereof.

10. The method of claim 1, wherein the reactant comprises an unsaturated sucrose octaester, and the product comprises an at least partially saturated sucrose octaester.

11. The method of claim 1, wherein the first stream consists of the reactant.

12. A method of catalytic hydrogenation, the method comprising:
providing a first stream comprising a reactant, wherein the reactant (i) comprises one or more unsaturated bonds or (ii) is a compound of formula (I)—

$$R^1\text{—[OCO—}R^2]_t \qquad (I),$$

wherein t is 1 to 10; $R^1$ and $R^2$ are independently selected from a $C_1$-$C_{30}$ hydrocarbyl; and
$R^1$, $R^2$, or $R^1$ and $R^2$ includes one or more unsaturated bonds;
providing a second stream comprising hydrogen;
providing a reactor bed having a first end and a second end, wherein the reactor bed comprises an activated carbon monolith catalyst comprising
  (a) a porous finished activated carbon monolith having walls defining at least one passage therethrough and comprising a supporting ceramic matrix and substantially discontinuous activated carbon particles dispersed throughout the supporting ceramic matrix, the walls having an exterior surface, depth, and passageways into the depth of the walls, and
  (b) at least one active catalytic material on said porous finished-activated carbon monolith, the at least one active catalytic material applied to the porous finished activated carbon monolith and disposed on the exterior surface of the walls and within the passageways into the depth of the monolith walls of the porous finished activated carbon monolith; and
disposing, at least once, the first stream and the second stream in the first end of the reactor bed to contact the first stream and the second stream in the at least one passage of the activated carbon monolith catalyst to convert at least a portion of the one or more unsaturated bonds to one or more saturated bonds, wherein the second stream is disposed in the first end of the reactor bed at a flow rate effective to achieve a hydrogen to unsaturated bond mole ratio of about 1 to about 3.

13. The method of claim 12, wherein at least 97% of the one or more unsaturated bonds are converted to the one or more saturated bonds during a single pass of the first stream through the reactor bed.

14. The method of claim 12, wherein the first end and the second end of the reactor bed are arranged at a first position and a second position, respectively, such that after the disposing of the first stream in the first end of the reactor bed, the first stream travels in an up-flow direction to the second end of the reactor bed.

15. The method of claim 12, wherein (i) the first stream is disposed in the first end of the reactor bed at a flow rate of about 0.03 LHSV hr$^{-1}$ to about 5.0 LHSV hr$^{-1}$, (ii) an internal pressure of the reactor bed is about 0.3 MPa to about 3.5 MPa, or (iii) a combination thereof.

16. The method of claim 12, wherein the first stream consists of the reactant.

17. A method of catalytic hydrogenation, the method comprising:
providing a first stream comprising a reactant, wherein the reactant (i) comprises one or more unsaturated bonds, (ii) is a liquid, and (iii)(a) has a viscosity of at least 30 cP (20° C.), (b) is a compound of formula (I), or (c) a combination thereof, wherein the compound of formula (I) has a structure according to the following formula—

$$R^1-[OCO-R^2]_t \qquad (I),$$

wherein t is 1 to 10; $R^1$ and $R^2$ are independently selected from a $C_1$-$C_{30}$ hydrocarbyl; and
$R^1$, $R^2$, or $R^1$ and $R^2$ includes one or more unsaturated bonds;
providing a second stream comprising hydrogen;
providing a reactor bed having a first end and a second end, wherein the reactor bed comprises an activated carbon monolith catalyst comprising
(a) a porous finished activated carbon monolith having walls defining at least one passage therethrough and comprising a supporting ceramic matrix and substantially discontinuous activated carbon particles dispersed throughout the supporting ceramic matrix, the walls having an exterior surface, depth, and passageways into the depth of the walls, and
(b) at least one active catalytic material on said porous finished-activated carbon monolith, the at least one active catalytic material applied to the porous finished activated carbon monolith and disposed on the exterior surface of the walls and within the passageways into the depth of the monolith walls of the porous finished activated carbon monolith;
disposing the first stream and the second stream in the first end of the reactor bed to contact the first stream and the second stream in the at least one passage of the activated carbon monolith catalyst to convert at least 97% of the one or more unsaturated bonds to one or more saturated bonds, wherein the converting of the at least 97% of the one or more unsaturated bonds to one or more saturated bonds occurs during a single pass of the first stream through the reactor bed, wherein the first end and the second end of the reactor bed are arranged at a first position and a second position, respectively, such that after the disposing of the first stream in the first end of the reactor bed, the first stream travels in an up-flow direction to the second end of the reactor bed, wherein (A) the first stream is disposed in the first end of the reactor bed at a flow rate of about 0.03 LHSV $hr^{-1}$ to about 5.0 LHSV $hr^{-1}$, (B) the second stream is disposed in the first end of the reactor bed at a flow rate effective to achieve a hydrogen to unsaturated bond mole ratio of about 1 to about 3, (C) a combination thereof; and
collecting a product that exits the second end of the reactor bed, wherein the product (i) comprises the one or more saturated bonds, (ii) is a solid at 20° C., or (iii) a combination thereof.

18. The method of claim 17, wherein the first stream consists of the reactant.

* * * * *